United States Patent
Tanotra (10) Patent No.: US 11,554,921 B2
(45) Date of Patent: Jan. 17, 2023

(54) METHOD FOR DETECTING AND REPORTING AN OPERATION ERROR IN AN IN-VITRO DIAGNOSTIC SYSTEM, A TRANSPORT DEVICE FOR A LABORATORY SAMPLE DISTRIBUTION SYSTEM, AND A LABORATORY SAMPLE DISTRIBUTION SYSTEM

(71) Applicant: Roche Diagnostics Operations, Inc., Indianapolis, IN (US)

(72) Inventor: Pankaj Tanotra, Stuttgart (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 17/447,247

(22) Filed: Sep. 9, 2021

(65) Prior Publication Data
US 2022/0089377 A1 Mar. 24, 2022

(30) Foreign Application Priority Data
Sep. 23, 2020 (EP) ..................................... 20197847

(51) Int. Cl.
*B65G 43/08* (2006.01)
*B65G 54/02* (2006.01)
(Continued)

(52) U.S. Cl.
CPC .............. *B65G 43/08* (2013.01); *B65G 54/02* (2013.01); *G01N 35/00871* (2013.01); *G01N 35/04* (2013.01)

(58) Field of Classification Search
CPC .. B65G 43/08; B65G 54/02; G01N 35/00871; G01N 35/04; G01N 2035/0477
See application file for complete search history.

(56) References Cited

U.S. PATENT DOCUMENTS

| 7,826,818 B2 * | 11/2010 | Gollnick | ............... H04L 1/0003 |
| | | | 455/412.2 |
| 10,989,725 B2 * | 4/2021 | Ren | ........................ B65G 54/02 |

(Continued)

FOREIGN PATENT DOCUMENTS

| EP | 2589966 | * 5/2013 | ............. B65G 54/02 |
| WO | 2012/158541 A1 | 11/2012 | |

(Continued)

OTHER PUBLICATIONS

European Search Report dated Mar. 3, 2021, in Application No. 20197847.5, 2 pp.

*Primary Examiner* — James R Bidwell
(74) *Attorney, Agent, or Firm* — Roche Diagnostics Operations, Inc.

(57) ABSTRACT

A method for operating a transport device in a laboratory sample distribution system, comprising: providing a transport device in a laboratory sample distribution system, the transport device having an arrangement of transport modules, wherein each transport module is provided with a transport surface; a drive device configured to move sample vessel carriers on the transport surface; a module control device configured to control operation of the drive device; and a module network interface connected to the module control device and configured for data communication in a control network; a transport plane; and a controller device connected to the control network through a controller network interface; and assigning a network address to each of the transport modules in the control network; for each transport module, in the module control device storing its own network address and the network address of neighboring transport modules located adjacent to the transport module.

13 Claims, 4 Drawing Sheets (51) Int. Cl.
    *G01N 35/00*    (2006.01)
    *G01N 35/04*    (2006.01)

(56)  References Cited

U.S. PATENT DOCUMENTS

| | | | |
|---|---|---|---|
| 11,226,348 B2* | 1/2022 | Vollenweider | G01N 35/04 |
| 2010/0185784 A1* | 7/2010 | De Nie | G06F 13/4291 |
| | | | 714/E11.146 |
| 2010/0185841 A1* | 7/2010 | Monreal | G06F 13/37 |
| | | | 713/340 |
| 2012/0293796 A1* | 11/2012 | Ludowise | G01N 35/04 |
| | | | 356/244 |
| 2015/0316874 A1* | 11/2015 | Katagiri | G03G 15/1665 |
| | | | 399/308 |
| 2015/0360878 A1 | 12/2015 | Denninger et al. | |
| 2016/0097786 A1 | 4/2016 | Malinowski et al. | |
| 2018/0210000 A1* | 7/2018 | van Mierlo | G01N 35/04 |
| 2019/0018027 A1 | 1/2019 | Hoehnel | |
| 2019/0131860 A1* | 5/2019 | Suzuki | B65G 37/02 |

FOREIGN PATENT DOCUMENTS

| | | |
|---|---|---|
| WO | 2016/038014 A1 | 3/2016 |
| WO | 2017/144219 A1 | 8/2017 |
| WO | 2017/211734 A1 | 12/2017 |

* cited by examiner

METHOD FOR DETECTING AND REPORTING AN OPERATION ERROR IN AN IN-VITRO DIAGNOSTIC SYSTEM, A TRANSPORT DEVICE FOR A LABORATORY SAMPLE DISTRIBUTION SYSTEM, AND A LABORATORY SAMPLE DISTRIBUTION SYSTEM

CROSS-REFERENCE TO RELATED APPLICATIONS

This application claims priority to European Patent Application No. 20197847.5, filed 23 Sep. 2020, the disclosure of which is hereby incorporated by reference in its entirety.

TECHNICAL FIELD

The present disclosure refers to a method for detecting and reporting an operation error in an in-vitro diagnostic system, a transport device for a laboratory sample distribution system, and a laboratory sample distribution system.

BACKGROUND

In-vitro diagnostic systems are applied for analyzing samples of a bodily fluid. The samples are received in sample vessels or containers which are processed in an in-vitro diagnostic system. The sample vessels may be handled by a sample vessel handling or distribution system, for example for locating the sample vessel in sample vessel carriers and for picking up the sample vessels from the sample vessel carriers.

SUMMARY

Although the embodiments of the present disclosure are not limited to specific advantages or functionality, a method for detecting and reporting an operation error in an in-vitro diagnostic system is provided for improved handling of the operation error without interrupting operation. Further, a transport device for a laboratory sample distribution system, and a laboratory sample distribution system are described.

In the in-vitro diagnostic system, the sample vessels are handled by a laboratory sample distribution system. The sample vessels may be moved along a processing line for processing, wherein the sample vessels and/or sample vessel carriers are moved by means of a transport device having one or more actuators and actuator drivers or driving devices for driving the actuator(s). For example, the sample vessels may be moved or relocated from a first working station to a second working station provided in the processing line in the in-vitro diagnostic system. The working stations may also be referred to as working locations.

In accordance with one embodiment of the present disclosure, a method for operating a transport device in a laboratory sample distribution system is provided comprising providing a transport device in a laboratory sample distribution system, the transport device having: an arrangement of transport modules, wherein each transport module is provided with a transport surface; a drive device configured to move sample vessel carriers on the transport surface; a module control device configured to control operation of the drive device; and a module network interface connected to the module control device and configured for data communication in a control network; a transport plane formed by the transport surface of the transport modules of the arrangement of transport modules; and a controller device connected to the control network through a controller network interface. The method further comprises assigning a network address to each of the transport modules in the control network; for each transport module, in the module control device storing its own network address and the network address of neighboring transport modules located adjacent to the transport module in the arrangement of transport modules; and applying a replacement operation comprising replacing an elected transport module by a replacement transport module; receiving, in the controller device, replacement information data indicative of the replacement of the elected transport module by the replacement transport module; and transmitting a broadcast message through the control network to the module control device of the transport modules including the replacement transport module, the broadcast message indicative of a start command. In response to receiving the broadcast message, transmitting a network address request from the module control device of the replacement transport module to the module control device of at least one of its neighboring transport modules, the network address request requesting the at least one neighboring transport module to provide the network address of the replacement transport module; and ignoring the broadcast message by the module control device of the transport modules of the arrangement excluding the replacement transport module. Further, in the replacement transport module receiving the network address of the replacement transport module from the at least one neighboring transport module, and storing the network address of the replacement transport module in the module control device; and receiving and storing the network address of the neighboring transport modules located adjacent to the replacement transport module in the module control device. The method further comprises receiving, in the controller device, a recovery message indicative of the replacement transport module being addressable by the network address for operation control.

In accordance with another embodiment of the present disclosure, a transport device for a laboratory sample distribution system is provided, comprising an arrangement of transport modules, wherein each transport module is provided with: a transport surface; a drive device configured to move sample vessel carriers on the transport surface, wherein the transport surface of the transport modules together form a transport plane of the arrangement of transport modules; a module control device configured to control operation of the drive device; and a module network interface connected to the module control device and configured for data communication in a control network. The laboratory sample distribution system is provided with a controller device connected to the control network through a controller network interface, wherein the arrangement of transport modules and the controller device are configured to: assign a network address to each of the transport modules in the control network; for each transport module, in the module control device store its own network address and the network address of neighboring transport modules located adjacent to the transport module in the arrangement of transport modules; and apply a replacement operation comprising to replace an elected transport module by a replacement transport module; receive, in the controller device, replacement information data indicative of the replacement of the elected transport module by the replacement transport module; and transmit a broadcast message through the control network to the module control device of the transport modules including the replacement transport module, the broadcast message indicative of a start command. In response to receiving the broadcast message, transmit a network address request from the module control device of the replacement transport module to the module control device of at least one of its neighboring transport modules, the network address request requesting the at least one neighboring transport module to provide the network address of the replacement transport module; and ignore the broadcast message by the module control device of the transport modules of the arrangement excluding the replacement transport module. In the replacement transport module, receive the network address of the replacement transport module from the at least one neighboring transport module, and storing the network address of the replacement transport module in the module control device; and receive and store the network address of the neighboring transport modules located adjacent to the replacement transport module in the module control device. Further, the arrangement of transport modules and the controller device are configured to receive, in the controller device, a recovery message indicative of the replacement transport module being addressable by the network address for operation control.

In accordance with yet another embodiment of the present application, a laboratory sample distribution system is provided comprising the transport device described herein in accordance with another embodiment of the present application.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The technology proposed provides for reliable and safe replacement of transport modules in the arrangement of transport modules in which the transport surface of the plurality of transport modules together form the transport plane for moving or transporting sample vessel carriers.

Messages, signals and/or other electronic data related to controlling operation of the transport device such as the replacement operation may be transmitted through a bus system or device which may be connected to the module control devices and the controller device. The bus system may comprise a control signal bus for transmitting control signals or data and a data bus for transmitting other (non-control) signals or data.

The start command provided by the broadcast message may by a command for starting or restarting a software application such as a firmware software application. The broadcast message may be free of a network address command, thereby providing the broadcast message (also) to the module control device of the replacement transport module for which network address information is still to be collected.

With respect to the method, the receiving replacement information data may further comprise the following: receiving error information data indicative of malfunction of an erroneous transport module being the elected transport module in the controller device; and in response to a clearing request provided in the controller device, clearing the transport plane of the erroneous transport module and the neighboring transport modules located adjacent to the erroneous transport module from any sample vessel carrier. Other information data indicative of malfunction of the erroneous transport module is received in the controller device. By such error information data the controller device is informed about the malfunction or non-functionality of the erroneous transport module. In response to such error information data, a clearing request is provided in the controller device for clearing the transport plane for the erroneous transport module from any sample vessel carrier. In case there is any sample vessel carrier located on the transport surface of the erroneous transport module at the time of providing the clearing request, the sample vessel carrier (s) is moved away from the transport surface of the erroneous transport module, for example, to the transport surface of a different transport module not being a neighboring transport module of the erroneous transport module. Thus, the erroneous transport module to be replaced as well as the neighboring transport modules located adjacent to the erroneous transport module are cleared from any sample vessel carrier. Following, cleared status information may be provided in a controller device. The cleared status information may be outputted through an output device connected to the controller device for user information. The cleared status information is indicative of a cleared status with respect to both the erroneous transport module and the neighboring transport modules.

The clearing of the transport plane may further comprise checking whether an object different from sample vessel carrier is located on the transport surface of at least one of the erroneous transport module and the neighboring transport modules. For example, the object may be some tool or any other object not being a sample vessel carrier located on the transport surface. If the presence of an object is detected, a request for clearance is provided in the control device and outputted through the output device to the user. If the transport surface of the erroneous transport module and the neighboring transport modules is cleared from the object, cleared status information can be outputted to the user. Also, in response to such clearance it can be continued with the replacement operation. Continuation of the replacement operation may be prevented until cleared status of both the erroneous transport module and the neighboring transport modules.

The clearing of the transport plane may further comprise receiving a user input indicative of confirmation for a replacement procedure for the erroneous transport module through a user interface in the controller device. In response to receiving the error information data in the control device, user information may be outputted to the user, the user information being indicative of error detection. The replacement procedure comprising the replacement operation is allowed to be started after receiving confirmation by the user input in response to outputting the user information indicative of the error detection.

The method may further comprise, while applying the replacement operation, continuing with operation of at least one remaining transport module of the arrangement excluding both the replacement transport module and the neighboring transport modules located adjacent to the transport module, wherein the continuing with operation comprises moving one or more sample vessel carriers on the transport surface of the at least one remaining transport modules and controlling movement of the one or more sample vessel carriers by the control device. While the replacement operation is conducted, at least one remaining transport module continues with controlled operation for moving or transporting sample vessel carriers on the transport surface. Conducting replacement operation while one or more remaining transport modules of the arrangement are continuing with controlled operation may be referred to as hot swapping. There is replacement or addition of a transport module without stopping operation of the at least one remaining transport module.

The applying of the replacement operation may further comprise, in the module control device of the replacement transport module, switching from a boot operation mode to an operation control mode in response to receiving the broadcast message, the operation control mode allowing for bidirectional data communication between the module control device of the transport modules in the control network which is not provided in the boot operation mode. The boot operation mode may be applied for basic set-up after replacement of the transport module. It may be switched from a firmware application to the boot application (boot operation mode). Thus, there is switching between a first and a second software application running on one or more processors of the transport device of the laboratory sample distribution system. In the first software application (boot operation mode) no bidirectional data communication between transport modules is available. Rather, broadcasting messages may be transmitted by the device controller. Such broadcast messages to be received by the control device of the transport modules of the arrangement without the broadcasting messages being addressed to some specific transport module (no (network) address command). By the second software application (such as operation control mode) data communication between transport modules is available, thereby, allowing for data or signal exchange from transport module to transport module. Such bidirectional data communication may be applied based on the network addresses assigned to the transport modules of the arrangement.

In the control network, the method may further comprise the following: applying a first communication protocol for transmitting the broadcast message; and applying a second communication protocol which is different from the first data communication protocol for transmitting control message comprising control commands and being addressed to at least one of the network addresses assigned to the transport modules. The first communication protocol is configured to transmit broadcast messages to be received by all transport modules. The second data communication protocol which is different from the first data communication protocol may be applied for transmitting control messages being addressed based on the network address assigned to one or more of the transport modules in the arrangement.

The receiving of the recovery message, in the controller device, may comprise one of receiving the recovery message from the replacement transport module, and receiving the recovery message from the at least one neighboring transport module.

The receiving and storing of the network address of the neighboring transport modules may further comprise the following: receiving neighboring information data indicative of the replacement transport module being connected to the neighboring transport modules in the controller device; transmitting a request for getting the network address of the neighboring transport modules from the controller device to the module control device of the replacement transport module; and transmitting a request for the network address from the module control device of the replacement transport module to the module control device of the neighboring transport modules. After the replacement transport module has been provided in the arrangement of transport modules, the neighboring information data indicative of such replacement are to be received in the controller device. In response, a request for getting the network address of the neighboring transport modules may be provided in the controller device and transmitted from the controller device to the module control device of a replacement transport module. In response to receiving such request, a request for the network address is provided in the module control device of the replacement transport module and transmitted to the module control device of the neighboring transport modules. Following, the neighboring transport modules provide information about its own network address to the replacement transport module which is in reception of such network addresses. The information about the network addresses of neighboring transport modules can be stored locally in a memory device of the replacement transport module. Alternatively or in addition, such information about the network addresses of the neighboring transport modules located adjacent to the replacement transport module may be transmitted to the controller device and stored in a memory device assigned to the controller device. Thus, in such embodiment the controller device has access to electronic information about which transport module is connected to which neighboring transported module in the arrangement of the transport modules.

For the transport device the transport modules may be arranged in a daisy chain topology. Daisy chaining is accomplished by connecting each transport module in series to the next. For transmitting messages or data signals, it may be provided that a message intended for a transport module parkway down the line, each transport module bounces it along in sequence until it reaches the destination (transport module which is addressed). The daisy chain can take two basic forms: linear or ring topology. Alternatively, transport modules of the arrangement may be arranged in a multi drop (electrical parallel) topology.

With respect to at least one of the transport device and the laboratory sample distribution system, the embodiments described for the method for operating the transport device in the laboratory sample distribution system may apply mutatis mutandis.

In order that the embodiments of the present disclosure may be more readily understood, reference is made to the following examples, which are intended to illustrate the disclosure, but not limit the scope thereof.

Figure 1:
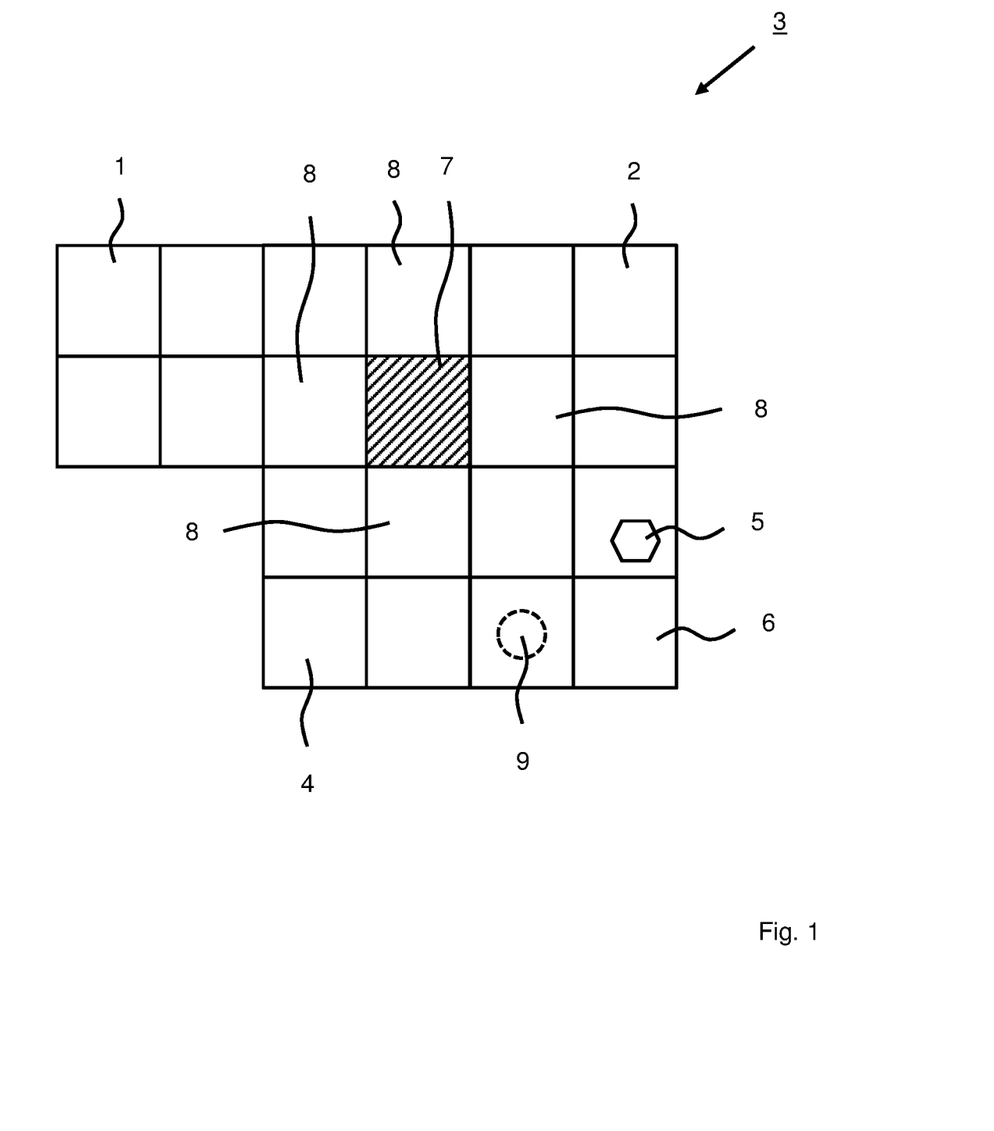
FIG. 1 is a schematic representation of an arrangement of transport modules provided by a transport device for a laboratory sample distribution system and forming together a transport plane for transporting sample vessel carriers.
Figure 2:
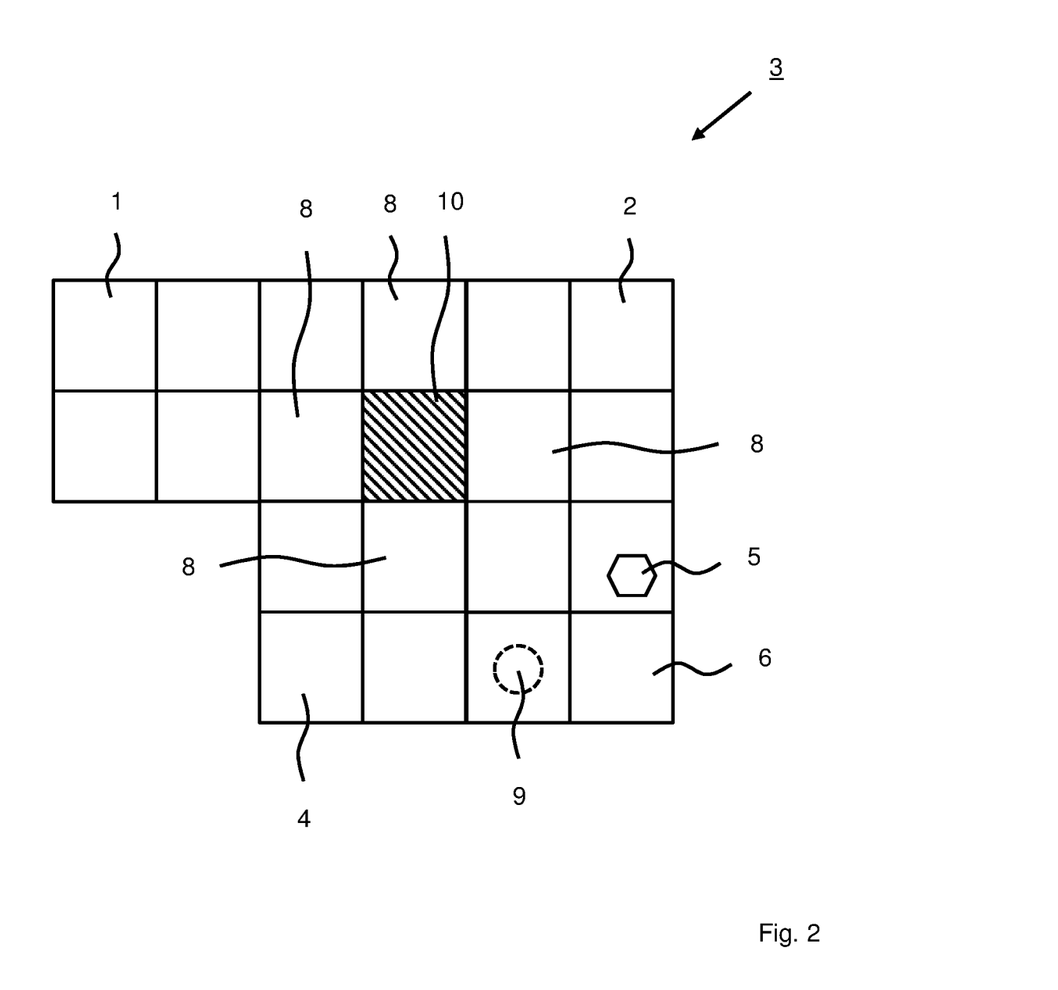
FIG. 2 is a schematic representation of the arrangement of transport modules in FIG. 1 with one of the transport modules replaced by a replacement transport module.

FIGS. 1 and 2 show, each in a top view, a schematic representation of an arrangement 1 of transport modules 2 providing a transport device 3 for a laboratory sample distribution system. The transport modules 2 are forming together a transport plane 4 for transporting sample vessel carriers 5.

The transport device 3 is built from the plurality of transport modules 2. The transport modules 2 may be fixed to a support frame (not shown). Each of the transport modules 2 shown has a square basic shape allowing building the transport device 3 of various designs by adding additional transport modules 2 at either side of already existing transport modules and/or moving transport modules 2 from the transport device 3. In other embodiments, the transport modules 2 may have a different basic shape, for example a triangular basic shape or a hexagonal basic shape. It may be provided that all transport modules 2 have the same basic shape. However, in alternative embodiments, the transport device 3 may be composed of transport modules 2 having different basic shapes.

Each of the transport modules 2 is provided with a transport surface 6. The transport surfaces 6 of the transport modules 2 in the arrangement 1 together form the transport plane 4. On the transport plane 4 the sample vessel carriers 5 can be transported or moved to different locations. A single transport module 7 from the arrangement 1 is encompassed by neighboring transport modules 8 located adjacent to the transport module 7.

Figure 3:
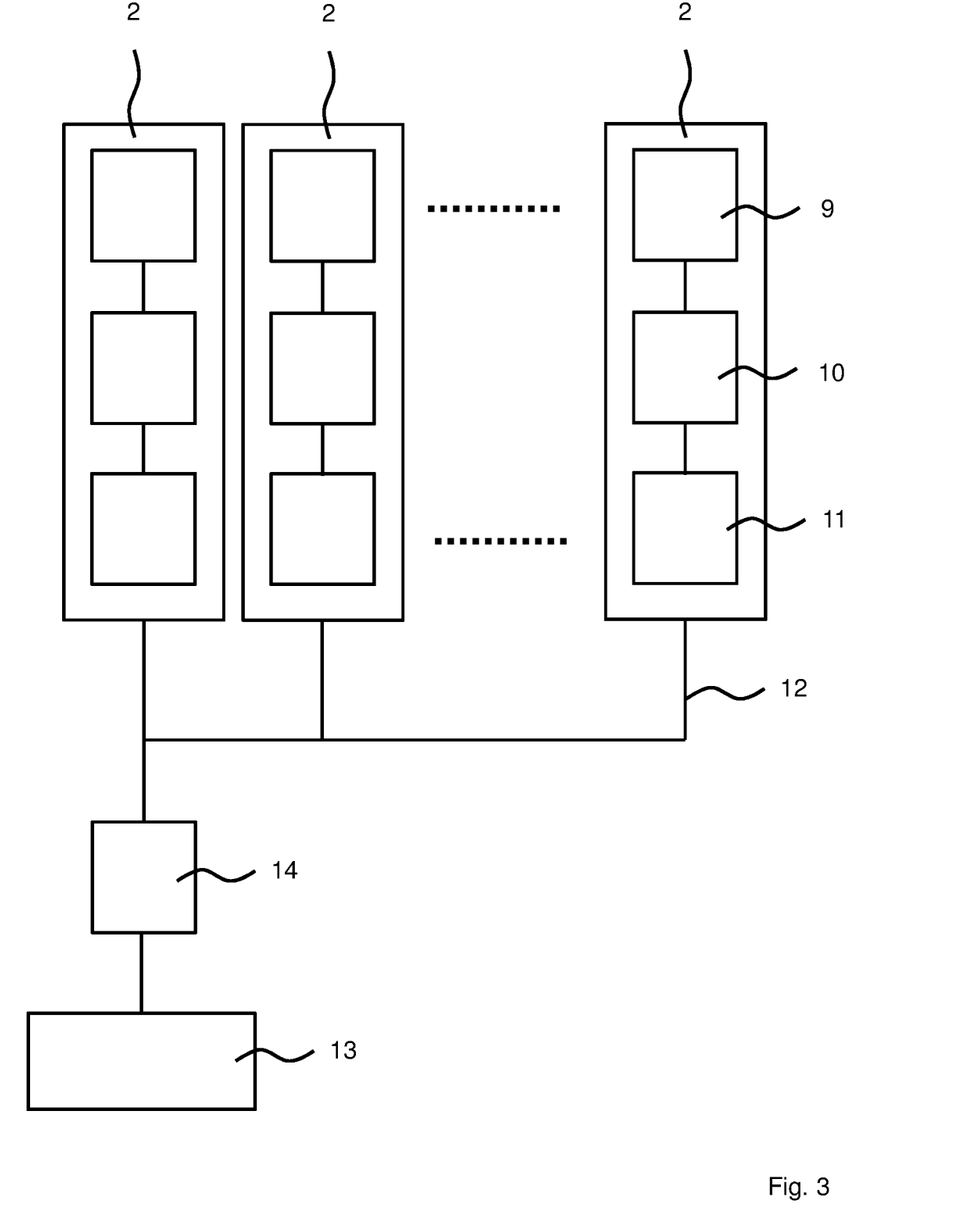
FIG. 3 is a schematic representation of functional components of the transport device.

FIG. 3 shows a schematic representation of functional components of the transport device 3. The transport modules 2 are each provided with a drive device 9 configured to move the sample vessel carriers 5 on the transport surface 6 and the transport plane 4. Referring to FIG. 1 and FIG. 2, for the example shown, the drive device 9 is depicted for only one of the transport modules 2, but is provided for each transport module 2 of the arrangement 1. The drive device 9 is located underneath the transport surface 6.

The transport module 2 each comprise a module control device 10 configured to control operation of the drive device 9. The module control device 10 is connected to or provided with a module network interface 11 configured for data communication in a control network 12 to which also a controller device 13 is connected through a controller network interface 14. The control network 12 may be provided with a data bus system for data communication, for example between the module control device 10 and the controller device 13.

Each of the transport modules 2 is assigned a network address. Such network address can be used for addressing electronic data to one or more transport modules 2 in the control network 12. For example, the controller device may transmit control signals to one or more of the transport modules 2 using the network address for controlling movement of the sample vessel carriers 5 on the transport plane.

In operation, movement or transport of the sample vessel carriers 5 on the transport plane 4 is controlled by the controller device 13 which is providing driving signals to the drive device 9 of the transport modules 2. Different implementations for the transport modules 2 as such are known in the art. Reference is made, for example, to document WO 2017/144219 A1, the disclosure of which is incorporated herein by reference.

Figure 4:
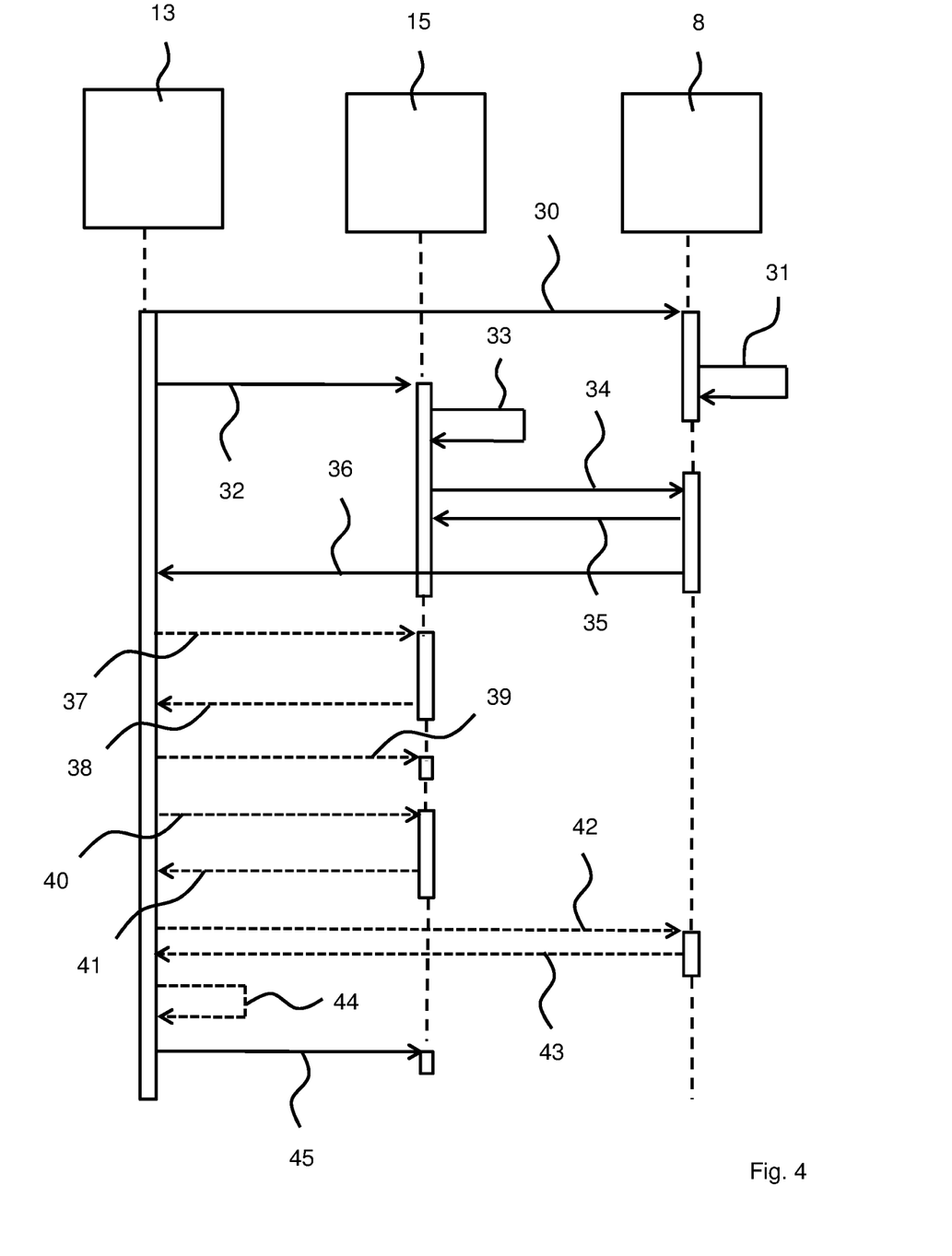
FIG. 4 is a schematic diagram for a method of detecting and reporting an operation error in a transport device of a laboratory sample distribution system.

If an error or malfunction is detected for the transport module 7 in the arrangement 1, a replacement procedure is applied for replacing the transport module 7 by a replacement transport module 15. FIG. 4 shows a schematic representation for procedural steps which may be applied in an embodiment of the replacement of the transport module 7 because of error detection. Steps conducted are depicted for the controller device 13, the replacement transport module 15, and its neighboring transport modules 8.

After the transport module 7 has been replaced by the replacement transport module 15, for example because of malfunction detected for the transport module 7, the replacement transport module 15 has to be included into the arrangement 1 of the transport modules 2. Such procedure may also be referred to as registering the replacement transport module 15 in the arrangement 1 of transport modules 2. As a result, the replacement transport module 15 will be available for controlled operation as one of the transport modules 2 forming together the arrangement 1 with the transport plane 4.

After replacement of the control module 7 by the replacement transport module 15, a first broadcast message is transmitted by the controller device 13 in step 30. The first broadcast message is indicative of a command to start or restart a firmware software application without network address which allows data communication between the transport modules 2, such bidirectional data communication between the transport modules 2 being not available in a boot operation mode applied before for basic set-up of the replacement transport module 15 after replacement. The first broadcast message is received, but ignored by the neighboring transport modules 8 (step 31). In step 32 the first broadcast message is (also) provided to the replacement transport module 15, causing the replacement transport module 15, specifically its module control device 10, to switch from the boot operation mode applied before, for example for basic set-up, to the firmware software application without network address in step 33.

Following, in step 34 a network address request is transmitted from the replacement transport module 15 to (at least one) neighboring transport module 8. In response, the neighboring transport module 8 provides the network address assigned to the transport module 7 now being replaced by the replacement transport module 15 to the replacement transport module 15 (step 35). Thus, the network address is provided to the replacement transport module 15 by module-to-module data communication. The address information indicating the network address assigned to the transport module 7 (before) and received in the replacement transport module 15 may be stored locally in a memory assigned to the replacement transport module 15 and connected at least to the module control device 10 of the replacement transport module 15.

Further, all of the neighboring transport modules 8 provide recovering information (recovery message) to the controller device 13 (step 36). The recovering information may be indicative of the replacement of the transport module 7 by the replacement transport module 15. Alternatively or in addition, information about the network address now assigned to the replacement transport module 15 may be provided to the controller device 13. The information received in the controller device 13 may be stored in a memory assigned to the controller device 13. Following, the replacement transport module 15 is addressable by the controller device 13.

Optionally, further steps may be applied in the replacement procedure. In step 37 a request for a field status of the replacement transport module 15 is transmitted from the controller device 13 to the replacement transport module 15. In response, the replacement transport module 15 informs about the field status in step 38. For example, the field status may be indicative of at least one of the following: (i) are there any sample vessel carrier 5 present on the replacement transport module 15; (ii) if yes, how many sample vessel carriers 5 are present, and (optionally) what is the location of the sample vessel carriers 5 on the replacement transport module 15; and (iii) are there metallic tools present on the surface of the replacement transport module 15.

Referring to step 39, the replacement transport module 15 is requested to save the network address of the neighboring transport modules 8 locally.

In step 40, 41 the controller device 13 requests information about the present version of firmware and/or software application applied and running in the replacement transport module 15. In response, such information is received in the controller device 13. Similarly, in steps 42 and 43 the controller device 13 requests information about the present version of software application running in the neighboring transport modules 8. Following, the version of the software application is checked in step 44.

Finally, in step 45 the replacement transport module 15 is set to the status "working" providing the replacement transport module 15 for controlled operation together with the other transport modules 2. Such replacement may also be referred to as hot swapping or hot plugging.

The replacement procedure described may be conducted while remaining transport modules of the arrangement 1, i.e., the transport modules excluding the transport module 7, the replacement transport module 15 and the neighboring transport modules 8, are continuing with controlled operation by moving or transporting sample vessel carriers 5.

What is claimed is:

1. Method for operating a transport device in a laboratory sample distribution system, comprising:
    providing a transport device in a laboratory sample distribution system, the transport device having
        an arrangement of transport modules, wherein each transport module is provided with: a transport surface; a drive device configured to move sample vessel carriers on the transport surface; a module control device configured to control operation of the drive device; and a module network interface connected to the module control device and configured for data communication in a control network;
        a transport plane formed by the transport surface of the transport modules of the arrangement of transport modules; and
        a controller device connected to the control network through a controller network interface;
    assigning a network address to each of the transport modules in the control network;
    for each transport module, in the module control device storing its own network address and the network address of neighboring transport modules located adjacent to the transport module in the arrangement of transport modules; and
    applying a replacement operation, comprising
        replacing an elected transport module by a replacement transport module;
        receiving, in the controller device, replacement information data indicative of the replacement of the elected transport module by the replacement transport module;
        transmitting a broadcast message through the control network to the module control device of the transport modules including the replacement transport module, the broadcast message indicative of a start command;
        in response to receiving the broadcast message,
            transmitting a network address request from the module control device of the replacement transport module to the module control device of at least one of its neighboring transport modules, the network address request requesting the at least one neighboring transport module to provide the network address of the replacement transport module; and
            ignoring the broadcast message by the module control device of the transport modules of the arrangement excluding the replacement transport module;
        in the replacement transport module,
            receiving the network address of the replacement transport module from the at least one neighboring transport module, and storing the network address of the replacement transport module in the module control device; and
            receiving and storing the network address of the neighboring transport modules located adjacent to the replacement transport module in the module control device; and
        receiving, in the controller device, a recovery message indicative of the replacement transport module being addressable by the network address for operation control.

2. The method according to claim 1, wherein receiving replacement information data further comprises:
    receiving error information data indicative of malfunction of an erroneous transport module being the elected transport module in the controller device; and
    in response to a clearing request provided in the controller device, clearing the transport plane of the erroneous transport module and the neighboring transport modules located adjacent to the erroneous transport module from any sample vessel carrier.

3. The method according to claim 2, wherein the clearing of the transport plane further comprises checking whether an object different from the sample vessel carrier is located on the transport surface of at least one of the erroneous transport module and the neighboring transport modules.

4. The method according to claim 2, wherein the clearing of the transport plane further comprises receiving a user input indicative of confirmation for a replacement procedure for the erroneous transport module through a user interface in the controller device.

5. The method according to claim 1 further comprising, while applying the replacement operation, continuing with operation of at least one remaining transport module of the arrangement excluding both the replacement transport module and the neighboring transport modules located adjacent to the transport module, wherein the continuing with operation comprises moving one or more sample vessel carriers on the transport surface of the at least one remaining transport modules and controlling movement of the one or more sample vessel carriers by the control device.

6. The method according to claim 1, wherein the applying of the replacement operation further comprises, in the module control device of the replacement transport module, switching from a boot operation mode to an operation control mode in response to receiving the broadcast message, the operation control mode allowing for bidirectional data communication between the module control device of the transport modules in the control network which is not provided in the boot operation mode.

7. The method according to claim 1 further comprising, in the control network,
applying a first communication protocol for transmitting the broadcast message; and
applying a second communication protocol which is different from the first data communication protocol for transmitting control message comprising control commands and being addressed to at least one of the network addresses assigned to the transport modules.

8. The method according to claim 1, wherein the receiving of the recovery message comprises one of, in the controller device,
receiving the recovery message from the replacement transport module; and
receiving the recovery message from the at least one neighboring transport module.

9. The method according to claim 1, wherein the receiving and storing of the network address of the neighboring transport modules further comprises,
receiving neighboring information data indicative of the replacement transport module being connected to the neighboring transport modules in the controller device;
transmitting a request for getting the network address of the neighboring transport modules from the controller device to the module control device of the replacement transport module; and
transmitting a request for the network address from the module control device of the replacement transport module to the module control device of the neighboring transport modules.

10. A transport device for a laboratory sample distribution system, comprising:
an arrangement of transport modules, wherein each transport module is provided with
a transport surface;
a drive device configured to move sample vessel carriers on the transport surface, wherein the transport surface of the transport modules together form a transport plane of the arrangement of transport modules;
a module control device configured to control operation of the drive device; and
a module network interface connected to the module control device and configured for data communication in a control network; and
a controller device connected to the control network through a controller network interface;
wherein the arrangement of transport modules and the controller device are configured to:
assign a network address to each of the transport modules in the control network;
for each transport module, in the module control device store its own network address and the network address of neighboring transport modules located adjacent to the transport module in the arrangement of transport modules;
apply a replacement operation, comprising to
replace an elected transport module by a replacement transport module;
receive, in the controller device, replacement information data indicative of the replacement of the elected transport module by the replacement transport module; and
transmit a broadcast message through the control network to the module control device of the transport modules including the replacement transport module, the broadcast message indicative of a start command;
in response to receiving the broadcast message,
transmit a network address request from the module control device of the replacement transport module to the module control device of at least one of its neighboring transport modules, the network address request requesting the at least one neighboring transport module to provide the network address of the replacement transport module; and
ignore the broadcast message by the module control device of the transport modules of the arrangement excluding the replacement transport module;
in the replacement transport module,
receive the network address of the replacement transport module from the at least one neighboring transport module, and storing the network address of the replacement transport module in the module control device; and
receive and store the network address of the neighboring transport modules located adjacent to the replacement transport module in the module control device; and
receive, in the controller device, a recovery message indicative of the replacement transport module being addressable by the network address for operation control.

11. The transport device of claim 10, wherein the transport modules are arranged in a daisy chain topology.

12. A laboratory sample distribution system, comprising a transport device according to claim 10.

13. A laboratory sample distribution system, comprising a transport device according to claim 11.

* * * * *